United States Patent Office 3,227,520
Patented Jan. 4, 1966

3,227,520
PRODUCTION OF MANGANESE SULFATE
SOLUTION
Joseph Samonides, Covington, Tenn., assignor to E. J.
Lavino and Company, Philadelphia, Pa., a corporation
of Delaware
No Drawing. Filed Jan. 30, 1962, Ser. No. 169,927
4 Claims. (Cl. 23—117)

This invention relates to the use of ferromanganese for the production of manganese sulfate solution for the electrolytic or chemical precipitation of high purity manganese dioxides.

In the past in producing manganese sulfate solutions there have been problems due to the formation of large filter cake which results in a filter cake disposal problem. This filter cake also results in a loss of manganese which is prevented from forming manganese sulfate because it becomes tied up in the filter cake.

Heretofore, processes for producing manganese sulfate have been hard on equipment and also required aeration to oxidize the iron in solution.

It is an object of the present invention to set forth a new process for producing manganese sulfate solution for the production of high purity manganese dioxide which overcomes the problems set forth above.

Another object of the present invention is the production of a manganese sulfate solution by reacting ferromanganese with spent electrolyte consisting of manganese sulfate and sulphuric acid, sulfuric acid and manganese dioxide ore.

A further object of the instant invention is the production of a manganese sulfate solution according to a process which is easy to handle and control and yet not hard on equipment.

A still further object of this invention is the production of a manganese sulfate solution for the electrolytic production of manganese dioxide in which the amount of filter cake obtained is extremely low and it also has a very low manganese content. The low production of filter cake accordingly eliminates the filter cake disposal problem.

Other objects and advantages will in part be obvious and in part appear hereinafter.

It has been found that a manganese sulfate solution for the electrolytic or chemical precipitation of high purity manganese dioxide can be produced from ferromanganese and manganese dioxide ore.

The success or failure in the use of ferromanganese in a reaction to make manganese sulfate solution depends on the ability to change the ferrous sulfate and precipitate it as, ferric hydroxide. The precipitate first forms as a dispersed phase, but on heating in the presence of the electrolyte at elevated pH's, it coagulates to a gelatinous mass which settles out of suspension easily. It has been found that reactions that become difficult to filter can be made filterable by adding acid so as to depress the pH between 1 to 2 and adding ferromanganese which when reacted will form ferrous sulfate. This ferrous sulfate which would be between 10–20 gms./liter when converted and precipitated as ferric hydroxide at elevated pH's as described in step VII, will absorb the slimy ferric hydroxide to a state easily filtered.

An important feature of the present invention is that, when using ferromanganese in reactions for the purpose of making manganese sulfate solution, the high iron concentration resulting from the ferromanganese has a beneficial effect in purifying the solution. The well-known principle of using ferrous sulfate in electrolyte to remove impurities takes place when the iron is hydrolyzed out of solution as a hydroxide. This hydroxide occludes such elements as calcium, potassium, sodium, arsenic and as might be expected from the general nature of occlusion, diavalent ions are more strongly occluded than monovalent ones.

It has also been found that the ability of the dense ferric hydroxide that is precipitated at pH's above 3 to absorb the slimy iron hydroxides that begin to precipitate at low pH's (approx. 2.5) is the key factor to a successful operation.

The process of the instant invention is illustrated by the following reactions:

The chemical analyses of the FeMn dust was found to be:

$MnO_2$ _____ 0.0
Average Mn _____ 75.13
Average Fe _____ 14.5

The screen analyses were:

Sieve size—
   20 mesh _____ 4.0
   40 mesh _____ 11.8
   60 mesh _____ 18.3
   80 mesh _____ 13.8
   100 mesh _____ 8.3
   140 mesh _____ 12.6
   Pan _____ 31.2
   Scott density _____ 60.5

The reaction between FeMn dust and sulfuric acid is shown in the following equation:

(1)  $FeMn + H_2SO_4 \rightarrow MnSO_4 + FeSO_4 + H_2$

Each pound of FeMn reacted with sulfuric acid produces an average of 0.39 lb. of ferrous sulfate ($FeSO_4$). This amount of ferrous sulfate in an acid solution, which acts as a reducing agent, reacts with manganese dioxide; manganese dioxide being a reasonably sufficient oxidizing agent. The reaction would be in effect one of the oxidation reduction type. The equation for this reaction is as follows.

(2) 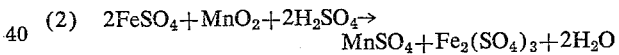 $2FeSO_4 + MnO_2 + 2H_2SO_4 \rightarrow MnSO_4 + Fe_2(SO_4)_3 + 2H_2O$ This indicates that 1 lb. of ferrous sulfate requires 0.286 lb. of $MnO_2$. Therefore, a reaction made with 1200 lbs. of FeMn would require approximately 185 lbs. of manganese dioxide ore containing approximately 75% manganese dioxide presently being used to oxidize ferrous sulfate to ferric sulfate in our reactions. The third equation indicates the conversion of the ferric sulfate to, and its precipitate as insoluble iron hydroxide.

(3) 
$$Fe_2(SO_4)_3 + 6HOH \xrightarrow[3.4-6.5]{pH} 2Fe(OH)_3 + 3H_2SO_4$$

Equation 4 represents the neutralization of the sulfuric acid that is formed when the iron has hydrolyzed and been precipitated as hydrous ferric oxide (Equation 3). Either lime, manganese oxide (green ore), or ferromanganese may be used as a neutralizer. These materials also facilitate the necessary rise of the pH to a point between 5.7 and 6.3.

(4) 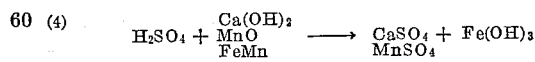
$$H_2SO_4 + \begin{matrix} Ca(OH)_2 \\ MnO \\ FeMn \end{matrix} \longrightarrow \begin{matrix} CaSO_4 + Fe(OH)_3 \\ MnSO_4 \end{matrix}$$

So far between 1200–1900 lbs. of FeMn has been used. This means that between 185–262 lbs. of manganese dioxide ore containing approximately 75% manganese dioxide is needed to oxidize the ferrous sulfate ($FeSO_4$) to ferric sulfate ($Fe_2(SO_4)_3$). It was discovered that more $MnO_2$ could be converted to manganese sulfate than was theoretically shown possible. The solution to this puzzle lies in Equation 5.

In Equation 1, one of the bi-products produced is hydrogen. This nascent hydrogen gas acts as a reducing agent and in the presence of sulfuric acid can reduce MnO₂ to manganese sulfate.

(5) $MnO_2 + H_2 + H_2SO_4 \rightarrow MnSO_4 + 2H_2O$

On the basis of this information, a reaction was made with FeMn and manganese dioxide in a strong acid solution.

To this solution was added 1700 lbs. of manganese dioxide ore. To the resultant slurry was added 1200 lbs. of FeMn. This solution was stirred for 10 hrs., which was the time needed for a completed reaction. At this point, the pH was at 3.5 and all of the iron was converted to ferric sulfate. At this point, as previously stated, either lime or more FeMn can be added to cause the necessary rise in pH and precipitation of iron.

After one hour of settling time the reaction was filtered. The time required to pump the solution through the filter was between 45–60 minutes. In less than 30 minutes the filter was washed back and upon opening it, very little filter cake was found on the screens. The analyses of that filter cake were found to be:

Total Mn _____ 10.48
As MnO₂ _____ 1.82
Total Fe _____ 19.7

To more precisely define the process of the instant invention, the following example sets for the process step by step.

Step I

Fill the reaction tanks with spent electrolyte (4,935 gals.). The spent electrolyte consists of approximately 1.12 lbs./gal. of manganese sulfate and 0.60 lb./gal. of sulfuric acid.

Step II

Add to the spent electrolyte (2,115 gals.) of makeup water. This makeup water consists of tap water used to wash the filter of its soluble manganese sulfate in the filter cake plus any other weak solutions of manganese sulfate available.

Step III

To the (7,150 gals.) preparation solution, add (70.5 gals.) of concentrated sulfuric acid of 66° Baumé. Stir this solution and allow to heat to approximately 130° F. (Steps I, II and III will be referred to as the preparation solution.)

Step IV

When the temperature of the preparation solution has reached approximately 130° F., add 1700 lbs. of manganese dioxide. This managanese dioxide can be any one of the ores known as Moroccan B. Hindus, African, all of which have been tried and found to be successful in this operation. These are all ores of manganese dioxide, with iron and silicon dioxide, analyzing from about 74% to about 88% manganese dioxide. Also a mixture in any ratio of these ores can be used. After the manganese dioxide ore has been added to the preparation solution, agitate and heat until the temperature reaches approximately 150° F.

Step V

Add 1300 lbs. of ferromanganese slowly to the hot black slurry. The reaction will be violent and caution must be used, otherwise the reaction will boil violently. The ferromanganese can be used successfully in a powder form (−100 mesh) or in larger particles, say between 8 and 100 mesh.

Step VI

Allow the hot slurry to stir for a minimum of 4 hours, preferably 10–12 hours. The particle size of the ferromanganese actually determines how long this slurry is allowed to react. When pH stability has been reached, the reaction is considered to have ceased. A sample of this solution is taken to the laboratory where pH, Baumé, and FeSO₄ analyses are performed. The pH generally runs around 2–3, Baumé between 22.0 to 24.0, FeSO₄ g./l. 15 to 30.

Step VII

In order to precipitate iron and other impurities out of solution as a hydroxide, elevate the pH to approximately 6.0–6.5. This can be accomplished by adding very fine ferromanganese dust or green ore (MnO) or lime ((Ca(OH)₂)). All have been used in production. Preferably ferromanganese dust is used.

The amount of ore required to elevate the pH from approximately 2 to 3 to a pH of 6.0–6.5 depends upon the concentration of ferrous sulfate in solution. The more ferrous sulfate in solution the more ore will be required to elevate the pH to 6. When there is a large amount of ferrous sulfate, say 10–70 gms./liter in solution, the use of air to facilitate the oxidation of ferrous sulfate to ferric hydroxide is needed. However, when the ferrous sulfate concentration is below 10 gms./liter, very little, if any, air is needed to remove the iron from the manganese sulfate solution. Reactions that contained ferrous sulfate from approximately 75–0.0 gms./liter in a manganese sulfate solution have been made. The ferrous sulfate concentration in a manganese sulfate reaction can be controlled by the ratio of black ore, manganese dioxide to ferromanganese that is used in the reaction. For example, a ratio of 2 parts of ferromanganese to 1 part of black ore, manganese dioxide will result in a concentration of approximately 75 gms./liter of ferrous sulfate in the manganese sulfate reaction; if a 1 to 1 ratio of black ore (MnO₂) and ferromanganese is used, the concentration of ferrous sulfate and the manganese sulfate reaction will be approximately 35 gms./liter of ferrous sulfate. On the other hand, if the ratio of black ore, manganese dioxide is greater than the ferromanganese, the ferrous sulfate concentration can be from 0.0 gm./liter to approximately 10 gms./liter.

It has been found that filtration can best be accomplished by having approximately 15 gms./liter of ferrous sulfate in solution before elevating the pH from approximately 2.0 to 3.0 to 6. The apparent reason for this is that when the ferrous sulfate begins to precipitate out at the elevated pH's, it absorbs the gelatinous iron hydroxides that have already formed which made filtration difficult.

Step VIII

After the iron has been completely removed by hydrolysis at a pH of approximately 6.0–6.5 with or without the aid of air, allow the completed reaction to settle for approximately 10 minutes to 1 hour and filter through the filter to the purification tank. The reason that approximately 10 minutes to 1 hour for settling out time is allowed is that the large particle size of the ferromanganese and carbon, plugs up the screen in front of the pump which pumps the filtrate through the filter press and into the purification tank. This problem may be remedied by grinding the ferromanganese down to such a size that one may turn on the stirrers and pump the reacting materials through the filter press into the purification tank without settling.

After the filtrate has been pumped out, there remains a large residue of mud which consists primarily of ferric hydroxide, carbon, and +20 mesh ferromanganese. This ferric hydroxide has to be washed out of the tank quite thoroughly. The importance of washing out the mud is, when adding the preparation solutions for the next reaction on the ferric hydroxide, the high acid concentration plus the agitation and the heating tend to break up the aggregates and cause the precipitation to become slimy which makes filtration very difficult. This problem can be removed by grinding the ferromanganese fine enough.

One salient feature about the addition of FeMn to the reaction tank is the fact that total reaction time is reduced if the FeMn dust is first screened onto 100 mesh screen. The larger size particles react more quickly with the higher acid solution. Then the finer particles can be added to the weaker acid solution. Reaction efficiency is increased and reaction time is decreased if the screening process is done for these reasons. The +100 mesh material needs a greater concentration of acid than does the −100 mesh material. When the FeMn is added unscreened, the more easily reacting −100 mesh material reacts a great deal of the acid solution needed to react the coarser material (+100 mesh). This screening action will filter out lumps of FeMn and coke. Lumps ranging in size from ¼–½″ diameter have been found.

Thus the present invention provides a process for the production of manganese sulfate solution which is easy on equipment, results in a more efficient use of manganese and eliminates the filter cake disposal problem.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A process of producing manganese sulfate solution from ferromanganese and ore consisting essentially of manganese dioxide, comprising adding water to an electrolyte consisting of manganese sulfate and sulfuric acid, adding 66° Baumé sulfuric acid in an amount necessary to react with both the ferromanganese and the manganese dioxide ore to produce the corresponding sulfates, stirring the solution and heating to approximately 130° F., then adding to the solution a manganese dioxide ore, agitating the slurry and heating to approximately 150° F., then slowly adding to the hot slurry ferromanganese in the ratio with respect to $MnO_2$ of from 2 to 1 to 1 to 2 to react with the acid to form manganese sulfate and ferrous sulfate and to release nascent hydrogen which together with sulfuric acid reacts with the manganese dioxide to form manganese sulfate, stirring the hot slurry while aerating until ferric sulfate is formed and a pH stability of from about 2 to 3 is reached, then adding a basic material selected from the group consisting of ferromanganese, manganese oxide and lime to raise the pH to about 6 to 6.5 to form iron hydroxide, allowing the solution to settle to precipitate the iron hydroxide and finally filtering and removing manganese sulfate solution.

2. The process of claim 1, wherein the hot slurry is stirred for from 4–12 hours.

3. The process of claim 1, wherein the solution is allowed to settle for from 10 minutes to 1 hour.

4. The process of claim 1, in which the ferromanganese is of a mesh size between −100 and +100 inclusive.

References Cited by the Examiner

UNITED STATES PATENTS

| | | | |
|---|---|---|---|
| 1,417,153 | 5/1922 | Fairlie et al. | 23—117 |
| 2,340,188 | 1/1944 | Jukkola | 23—117 X |
| 2,451,647 | 10/1948 | Allen | 23—117 |

OTHER REFERENCES

Mellor: "A Comprehensive Treatise on Inorganic and Theoretical Chemistry," Longmans, Green & Co., New York, N.Y., volume 12, 1932, page 401.

MAURICE A. BRINDISI, *Primary Examiner.*